United States Patent [19]
Butler

[11] 3,871,779
[45] Mar. 18, 1975

[54] MECHANICAL CONNECTIONS

[76] Inventor: James W. Butler, 117 Grant Ave., Bellevue, Pa. 15202

[22] Filed: Dec. 19, 1972

[21] Appl. No.: 316,492

Related U.S. Application Data

[63] Continuation-in-part of Ser. Nos. 311,785, Sept. 26, 1963, abandoned, and Ser. No. 873,680, Nov. 3, 1969, abandoned.

[52] U.S. Cl. .................. 403/52, 3/28, 403/105, 403/352
[51] Int. Cl. .............................................. A61f 1/04
[58] Field of Search .......... 403/52, 53, 54, 55, 105, 403/110, 350, 351, 352, 374; 3/22, 23, 25, 26, 27, 28; 192/72

[56] References Cited
UNITED STATES PATENTS

| | | | |
|---|---|---|---|
| 506,039 | 10/1893 | Freeman | 287/DIG. 8 |
| 2,551,537 | 5/1951 | Havens | 3/27 |
| 3,368,834 | 2/1968 | Stratiento | 403/352 |

FOREIGN PATENTS OR APPLICATIONS

| | | | |
|---|---|---|---|
| 163,720 | 8/1949 | Austria | 3/27 |
| 488,333 | 12/1953 | Italy | 3/27 |

*Primary Examiner*—Werner H. Schroeder

[57] ABSTRACT

There is disclosed a rotatable mechanical joint and improvements more particularly in but not necessarily limited to artificial legs and other prosthetic devices; the object being to provide a mechanical joint which enables periodic instant braking or cessation of rotation relative to each other of elements connected thereto with the rotatable joint consisting of a three-basic-element wedge-mechanism.

15 Claims, 5 Drawing Figures

PATENTED MAR 18 1975 3,871,779

INVENTOR.
James W. Butler
BY

ATTORNEY

MECHANICAL CONNECTIONS

The present invention is a continuation-in-part of application Ser. No. 311,785, filed Sept. 26, 1963, now abandoned, and application Ser. No. 873,680, filed Nov. 3, 1969, now abandoned.

This invention relates to rotatable mechanical joints and improvements more particularly in but not necessarily limited to artificial legs and other prosthetic devices; the object being to provide a mechanical joint which enables periodic instant braking or cessation of rotation relative to each other of elements connected thereto. The three-basic-element wedge-mechanism with which the present invention is concerned in shown and described in my patent application Ser. No. 311,785, filed Sept. 26, 1963.

In addition to knee and ankle joints for artificial limbs, the improvement of other similar knee-type flexible joints is also among the objects of the present invention. The similar joints in walking-dolls or a robot, for example, as well, however, as the flexible and lockable joint of a leg supporting brace for supporting an existing though in some way impaired natural limb of an individual. Also any similar joint, for swiveling as well as flexing rotation, in which the periodic braking or cessation of rotation relative to each other of appended extending elements may be required or desired; preferably to lock such joints against rotation, or the flexure of their appended extending elements, in one rotative direction while still enabling unimpeded reverse rotation.

The rotatable wedge-mechanism of the present invention may be substituted to good advantage as a ratchet in many devices in which a conventional ratchet is employed. Being toothless, it will enable infinite degrees of ratcheting rotation which in a toothed ratchet is determined by the number of or the spacing between its teeth. And, while even though the need for a ratchet is indicated in the knee-joint of an artificial leg, for example, and even if the ratcheting sounds could be eliminated or muffled, the spacings between the teeth represent degrees of rotation that could not be controlled with a toothed ratchet and, therefore, unacceptable in an artificial leg.

While the toothed ratchet is irreplaceable in many devices, a spring-wound clock mechanism, for example, in a load-bearing device it has some deficiencies. Like a chain, it will have a "weakest link": either the pawl or the pin that holds it to pivotally ride over the slanted back-face of the teeth or its teeth. And when the possible weak points of the toothed ratchet are considered, the size and strength relationships of the toothless-ratchet of the present invention should compare most favorably with it. Since the toothless ratchet will bind or wedge into a rigid, solid-like structure; obstructing further rotation, or slipping, in one rotative direction while still enabling overriding of the wedging elements in the opposite or reverse rotative direction, just as the toothed-ratchet is designed to operate.

In the same way, tensioning devices may be improved, under springwound or other constant tension, to take up the slack of wire or cables that may be expected to stretch after installation and steel strip or other rolled product which elongates with any reduction of its thickness in the processes. By the straightening-out, so to speak, of the continuous curve or endless circle of the gradually deepening groove of the three elements of the present invention, a straight or bar-type toothless-ratchet or tensioning device is also contemplated; which would also require some initial spring or other built-in constant tensioning.

A toothless-ratchet wrench is another example also provided and improved with the enabled adjustment of it in cramped quarters by the also provided infinite degrees of ratcheting rotatability of its wedging elements relative to each other. And, with multiple wedge and groove elements, to be wedged simultaneously, with consequent multiple wedge points evenly spaced peripherally, its strength, compactness and balance and stability will be greatly enhanced.

Evenly spaced, curving or depthwise slanted, shallow groove scorings may be added to one or both of the mating surfaces of the wedge and mating groove of the toothless-ratchet of the present inventions scored in the incidence direction anticipated in adjustment of their wedgment. This will, in effect, provide teeth to the otherwise toothless-ratchet without impeding the reverse movement or rotation or ratcheting of the device. The wedging element will be guided out of mesh with the grooved element in its reverse sliding movement in the same but reverse direction of its entry.

A clutch mechanism for transmission of rotative power is also provided with the use of the toothless-ratchet of the present invention; although it may be merely interchangeably so classified. The clutch mechanism will be overriding in either rotative direction just as is the toothless-ratchet wrench; the latter of which can be adjustably set to ratchet in either rotative direction or in a neutral position be set to rotate freely or to wedge-lock in both rotative directions with alternately arranged adjustable wedging elements.

The power transmission clutch may also be enabled to override in both rotative directions, however, arranged to slip and reversely slide or override when a driven element is rotating in either rotative direction; providing or prohibiting "free-wheeling," selectively, of the driven or output shaft irrespective of the rotation of the driving or input shaft.

The overriding in both rotative directions would be enabled by the addition of resilient or cushioned means between the multiply spaced wedge and groove elements. This will enable the elements themselves to compress or re-expand, or be otherwise assisted, so as to enable the wedging elements to slip under a predetermined torque-pressure, such as that produced at the idling speed of the engine of an automobile, and, with any increase in the torque-pressure beyond also predetermined limits, through acceleration of the speed of the said engine, to cause an instant or gradual automatic, non-resilient or axially pressured wedgment of the respective wedge and groove elements.

A flexible-coupling, also for transmission of rotative power, is also enabled or its utilization obviated by the addition of resilient or cushioned means between multiply spaced wedge and groove elements of the power transmission clutch; although other means may also be used to enable their automatic movement in both axial directions. The additionally provided resiliency in the clutch will also provide for absorption of the shock produced in the initial rotation of the driven or output shaft, which is the purpose for a flexible-coupling.

The invention relates to artificial limbs primarily, however, and particularly to improvements in the knee and ankle joints of an artificial leg. The object being to provide elements for such prostheses that will operate in a most natural manner, manipulation of which is instinctively initiated by natural reactions of the wearer of the device in the normal processes of walking and rising, as from a seated position, in stooping and bending and even in the stumble recovery occasionally required and experienced by persons with natural limbs.

Since the object as well as the function, if not also the operation, of the three-basic-element wedge-mechanism of the present invention is the same as that fully described and explained, when adapted to improvements in artificial limbs, in a sister continuation-in-part patent application, Ser. No. 873,766, filed Oct. 31, 1969, and now U.S. Pat. No. 3,666,299, issued May 30, 1972, however, only that portion of the object and function of the present invention necessary to show the relationship will be necessary herein.

The conventional prosthesis of the type with which the present invention is concerned requires unnatural movements of various portions of the body of the wearer to tense straps or cables riding over rollers to stop or freeze rotation of the respective parts of the braking mechanisms employed. Others, employing wedge action similar to that of the present invention, purposely include unnatural looseness or play at the hinging axle which, though resilient or cushioned to control the play and to prevent rattling, are uncontrollable to the degree necessary for complete reliability. Such looseness or play is necessary for free rotation when unweighted and, when weighted, for engagement of its wedging or braking elements, to stop rotation or further flexure of the limb.

In the foot portion of such existing devices, there is either a complete elimination of flexibility in favor of controllable rigidity or a compromise between the two.

The combination of unnatural manipulation requirements demanded of the wearer also requires a special concentration of thought on every step taken. The required body movements, weight or pressure applications must also come at precise intervals, and pressure, when applied, must continue throughout a complete cycle without relaxation for an instant lest the limb collapses. The same applied pressure used to lock the mechanism against flexure will, in most cases, also lock it against all rotation making it impossible of extension, as when rising from a seated position, when such pressure is applied or continued in the process.

All of the deficiencies are objectionable, contributing to the general discomfort and fatigue of the wearer of the device, but even more objectionable is the unnatural appearance and faltered gait so produced. Additionally, such prior art devices are slow in responding to the will of the wearer, delaying braking action, also encouraging use of limit-stops to confine flexure to the more easily controllable range of something less than 15° of rotation. Beyond that range with other such devices there is little or no control of flexure and sudden collapse of the limb is possible, with some damage of its elements to be expected.

All conventional devices of the class to which the subject invention pertains depend on friction of related parts for proper operation, including the wedge and grooved pulley types which employ the built-in play or looseness of axis pins. Lubrication of any kind must be carefully avoided with consequent probabilities of occasional frictional sounds being emitted. It is also among the objects of the present invention to utilize rather than to shun lubrication of such devices and to overcome the other objectionable features and deficiencies outlined. Lubrication will eliminate the possibility of frictional sounds being emitted while adding wearing life also to parts often considered as expendable in conventional devices.

Since infinite degrees of controlled rotation and reverse ratcheting is provided, within required and optionally planned limits, flexure can be stopped at any desired position and resumed or reversed for extension when also desired. Extension is permitted even when the mechanism is locked against flexure, making it possible to stand from a seated position with weight applied and using the natural leg stump as the only upward impellent if it is of sufficient length and strength equal to the task. Braking in flexure will be immediate and instinctive, rather than by thought-directed impulse.

Any remaining portion of the leg stump of an amputee can operate the controlling linkage provided, but the degree of surgery will determine to what extent the leg stump, and the wearer, can successfully duplicate the performance of the previously operational natural limb. Obviously, the longer and healthier the remaining portion of the leg stump of an amputee, the greater the inherent advantage and strength that will be available to sustain, raise and lower the body weight of the individual in the process of walking, stooping, and standing with the optimum being surgery which leaves the entire femur bone intact; as in the use of an above-the-knee prosthesis.

The ankle-joint may be identical, except for size, with the knee-joint and similarly spring-loaded and adjustably controlled by the leg stump of the wearer whether it is the only joint, in a below-the-knee prosthesis, or when it is conjoined with the knee-joint in an above-the-knee prosthesis.

The invention, then, comprises the features herein fully described and as particularly pointed out in the claims, the following description and annexed drawings setting forth in detail certain illustrated embodiments of the invention, these being indicative of but some of the several ways in which the principles of the invention may be employed.

Figures 1, 2:
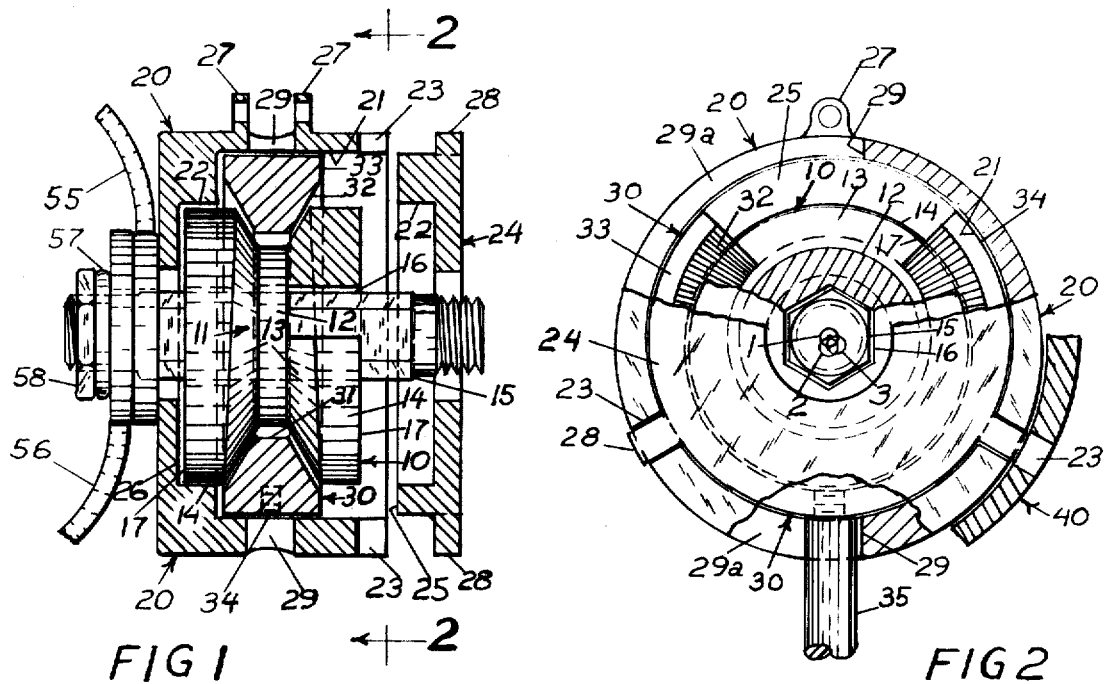
FIG. 1 is a rear elevational view, partly in section, of the mechanism of the present invention in simulated attachment to and between the upper and lower sections of an artificial leg, in partly but not completely assembled condition.
FIG. 2 is a side elevational view, partly in section, taken substantially on lines 2—2 of FIG. 1 after its assembly, with cut-away views of some of the interlocking elements.

Referring more particularly to the drawings, the numeral 10 represents the grooved pulley of FIG. 1, which, to permit assembly, is necessarily in split or half sections when its mating wedge ring 30 is continuous in circular length; although any of many conventional means may be employed to fuse one said section in tight and unyielding bond with the other. Adjusting ring 20 may be in identical split or half sections also, but, to provide a continuous or, as in the illustration, a near-continuous raceway and bearing support for wedge ring 30, its bulk is shown in one piece with bracing plate 24 completing the assembly. Grooved pulley 10 may be keyed to and rotate with shaft 15 but, as illustrated, the mainly hexagonal shaft 15 passes through the hexagonal bore 16 of grooved pulley 10 and a similarly formed opening in upper leg braces 55 then becoming rounded for rotation relative to lower leg braces 56, terminating in a threaded portion at both ends to receive a washer 57 and threaded fastener 58 to bind all parts in rotatable connection with each other.

Figures 3, 4, 5:
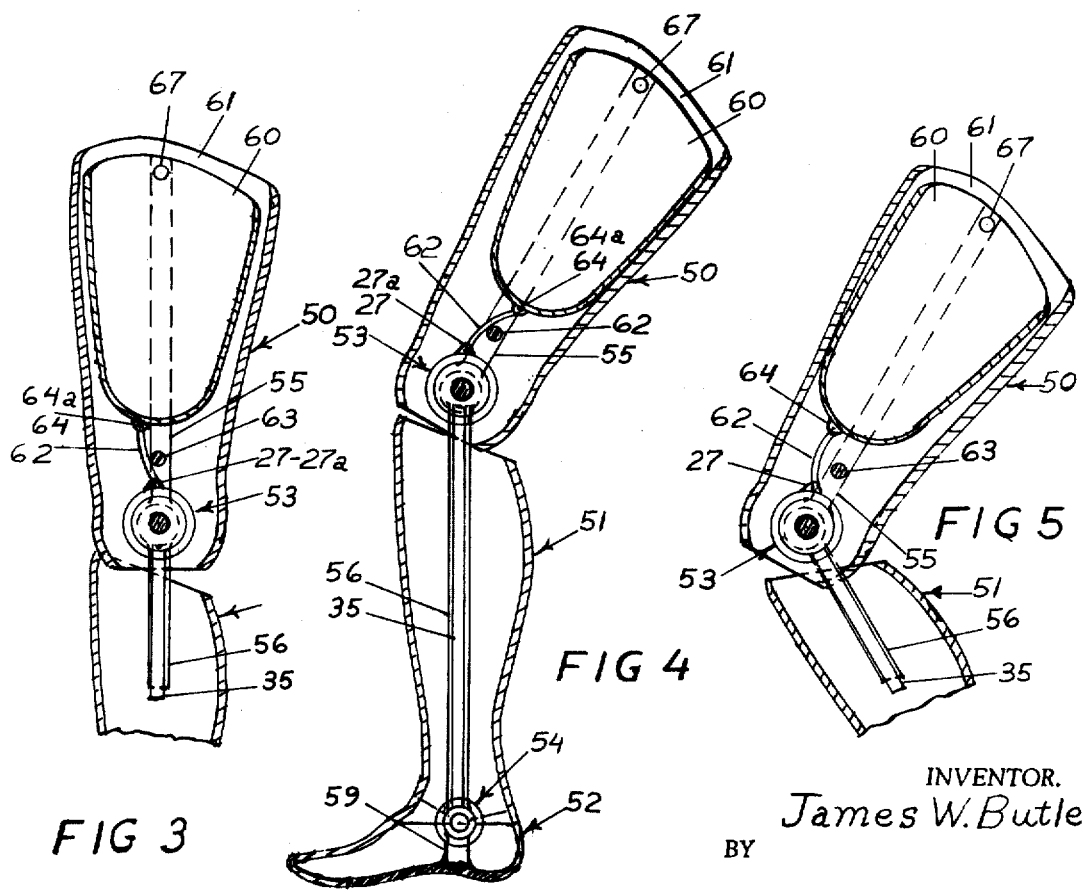
FIG. 3 is a side elevational view, in cross-section, of the upper and lower sections of an artificial leg, to which the wedge mechanism of FIG. 1 has been added and shown in reduced size, with a stump control socket shown within and movable relative to a conventional stump socket and in a neutral position with regard to its pendulum movement to forward and rearward extremes.
FIG. 4 is a side elevational view similar to that of FIG. 3, to which a foot section and a smaller wedge-mechanism has been added, with the stump control socket shown in the rearward of position relative to the conventional stump socket.
FIG. 5 is the same view as that of FIG. 3 except with the stump control socket shown in the forward extreme of position relative to the conventional stump socket.

In FIGS. 3, 4 and 5, the wedge-mechanism of FIGS. 1 and 2 is shown in reduced size as a knee-joint 53 which connects the upper and lower leg sections of an artificial leg, 50 and 51 respectively. The upper leg section 50 is hollow and representative of a conventional stump socket 61 to which a stump control socket 60 is added and pivotally joined to the conventional stump socket on both interior sides by socket pin 67. The pendulum movement of the leg stump of the wearer of the artificial leg so provided is extended to the adjusting ring 20 of the knee-joint 53 through control linkage 62, being pivotally connected at the lower extreme of control socket 60 by pin 64a at bracket 64 and at adjusting ring 20 by pin 27a at bracket 27, with a pivotal bar 63 placed midway between and anchored at both its ends to upper leg braces 55.

In FIG. 3, the stump control socket 60 is seen in the neutral position relative to the conventional stump socket 61, with control linkage 62 resting against pivotal bar 63, midway between, holding the adjusting ring 20 of knee-joint 53 in the neutral position also. In FIG. 4, pivoting at socket pin 67, stump control socket 60 has been rotated counter-clockwise to the extreme of pendulum adjustment relative to conventional stump socket 61 and to the opposite or clockwise extreme in FIG. 5. Resilient means may be employed to aid adjustment of adjusting ring 20 or to hold it in the neutral position or merely to resist its movement to either extreme, but, as illustrated, a counter-clockwise rotation of stump control socket 60 by the leg stump of the wearer of the device, with control linkage 62 pivoting at pivotal bar 63, will cause an also counter-clockwise rotation of adjusting ring 20 relative to grooved pulley 10 of knee-joint 53. And, except for the prevention of accidental collapse of the artificial leg, this adjustment will be the only one needed in operation and control of knee-joint 53.

Wedge ring 30, as illustrated in FIG. 1, is assumed as being continuous in circular length and shown as taper-wedge of cross-sectional formation with its tapered faces 32 in spaced relationship with similarly tapered faces 13 of grooved pulley 10 and its parallel side faces 33 in slidable relationship with parallel side faces 25 of adjusting ring 20. Bracing faces 26 of adjusting ring 20 will be in similar slidable contact with the back faces 17 of grooved pulley 10, in final and bound assembly, with evenly spaced lugs 28 of illustrated bracing plate 24 arranged to fit snugly into notches 23 to assure constant concentricity with each other of the inner eccentric faces 22 of adjusting ring 20.

It is obvious that when both wedge ring 30 and grooved pulley 10 are continuous in circular length, rather than in fractional curved segments as is also their contemplated use, either may be considered as interchangeable in their use as well as in their designation. They may be split cross-sectionally into fractional sections also, tapering radially inwardly or outwardly and alternately spaced in any number of matched pairs. Either may also be pinned to and arranged to rotate with any element designed to be appended to either, such as the illustrated upper and lower leg braces, 55 and 56 respectively, and extension arm 35. Either may also be resiliently urged axially toward or away from the other, to provide for their compression axially or resistance to such compression, enabling predetermined degrees of purposeful slippage in rotation relative to each other when otherwise the condition of their relationship would result in wedgment of their respective tapered faces.

It is obvious, also, in the illustration of groove 11 of grooved pulley 10 in FIG. 1, that when wedge ring 30 is continuous in circular length, its base 31 cannot be made to cross or have its lines of torque force directed across a groove base 12 which is equal to or greater than the width of base 31. The said base 12 must therefore be considered as being located at a circumferential and radial line where, in its depth, groove 11 (or then assumed base 12) does not exceed the width of base 31: at the circumferential depth in the groove 11 beyond which base 31 cannot penetrate, radially inwardly or outwardly, as the case may be, without causing wedgment of respective tapered faces.

In FIG. 2, the numerals 1, 2 and 3 represent center points for the peripheral and inner circular faces of the three rotatable elements of FIG. 1; when they are in a previously mentioned neutral position relative to each other. The inner face 21 of adjusting ring 20, the outer or peripheral face 34 and inner face or base 31 of wedge ring 30, and the base 12 and bore 16 of grooved pulley 10 are all concentric with each other and with shaft 15 and all represented as on true center by center point 1. The inner face 22 of adjusting ring 20 and the outer or peripheral face 14 of grooved pulley 10 are formed eccentrically of those designated as concentric surfaces and formed eccentrically sufficiently only for the purpose a machinist's error of a few thousandths of an inch could serve the same purpose. They are represented by eccentric center point 2. Adjusted center point 3 indicates the shifted position of all circular surfaces concentric with base 12 initially, or when in the neutral position, after adjustment of adjusting ring 20; which adjustment may be made in either rotative direction relative to grooved pulley 10. When so adjusted and when in rotation in the same rotative direction, the base 31 of wedge ring 30 will be directed eccentrically across the unchanged base 12 of grooved pulley 10, wedge-locking wedge ring 30 against further rotation in the direction of the wedgment while still enabling reverse rotation even though adjusting ring 20 may of necessity remain or be held in the adjusted position.

While so adjusted and wedged and still under the initially caused pressure, as will occur in maintaining the partially stooped position of the illustrated artificial leg of FIG. 4, little effort will be needed to attain or maintain the adjusted position of adjusting ring 20, since friction of the outer face 34 of wedge ring 30 in contact with inner face 21 of adjusting ring 20 when both are rotating in the same direction will actually aid the adjustment. Even with continuance of the same adjusting pressure, however, that pressure will be neutralized or overwhelmed in any desired reverse rotation of wedge ring 30 relative to grooved pulley 10, such as would occur in re-extension or straightening of a priorly bent or flexed artificial leg. The previously described result of the lines of force at base 31 of wedge ring 30 being directed eccentrically across the unchanged base 12 of groove 11 of grooved pulley 10 will also be reversed, with the force then directed eccentrically from the outer face 34 of wedge ring 30 across the inner face 21 of adjusting ring 20, forcing reversal of adjusting ring 20 or sufficiently so at least to permit regression of base 31 from wedgment in groove 11 or at base 12; and with no reliance on friction for such movement. While being so reversed, or ever so slightly, the mechanism will still remain in a condition to instantly reproduce the same wedgment with another reversal of the force direction of wedge ring 30; which, in that case, could be the result only of cessation of the prior re-extension of the artificial leg and the mere holding of any stooped position attained, permitting wedge ring 30 to rotate sufficiently only for the mechanism to lock itself.

The looseness of or the play in the connections of the linkage used to adjust adjusting ring 20, or the resilience of the linkage itself, will enable sufficient reversal of it as well as a frictionless forced reversal of wedge ring 30, thereby permitting adjusting ring 20 to remain in the adjusted position to again produce an automatic wedgment within the mechanism upon relaxation of any re-extension effort.

Extension arm 35, shown in FIG. 2 but not in FIG. 1, is rigidly connected to wedge ring 30 and designed to protrude through and to traverse a peripheral slot 29a provided for the purpose through a portion of the periphery of adjusting ring 20 which area is defined by upper and lower limit stops 29, both shown exposed in FIG. 1. In FIG. 4, the extension arm 35 is assumed as being similarly connected to wedge ring 30 of knee-joint 53 and to another wedge ring 30 within a smaller wedge-mechanism or ankle-joint 54, also shown, which in turn connects lower leg section 51 with foot section 52 by the joining of lower leg braces 56 with foot braces 59. Along with lower leg braces 56, extension arm 35 will then rotate with wedge ring 30 and lower leg section 51 and relative to grooved pulley 10 and upper leg section 50. The functions of leg braces 56 and extension arm 35 at the ankle-joint 54 may be optionally reversed, however, with the said leg braces rigidly connected to wedge ring 30 and the said extension arm pivotally connected to adjusting ring 20 to permit control of both the knee and ankle joints by the leg stump of the wearer of the device; which is also provided for and explained in more detail in my U.S. Pat. No. 3,666,299.

Complete relaxation of the wearer of an artificial leg, with inadvertent relaxation included as well as an intentional kind, is also among the objects of the present invention; to the extent, at least, of the ability of the prosthesis so produced to sustain whatever usage it may be subjected to.

It would be most desirable, as an example, for the individual involved to be able to maintain the stooped position illustrated in FIG. 4 without exerting even the meager effort seemingly required to maintain adjusting ring 20 in its adjusted position; much more than that of which is evidently needed to maintain the position as illustrated. Relaxation of all effort needed to maintain the position would immediately permit adjusting ring 20 to return to the neutral position with consequent collapse of the artificial leg.

Similarly, when walking all control is relaxed at the knee-joint of the leg swinging forward preparatory to taking the next weighted step, and in an upward step, at a street corner or sidewalk curb, for example, it is possible to accidentally kick the step or curb before clearing it. In such an event, as can be seen in FIG. 3, the conventional stump socket 61 would be caused to rotate relative to stump control socket 60, rather than the reverse, in effect causing stump control socket 60 to rotate to the extreme clockwise position illustrated in FIG. 5. If adjusting ring 20 were also caused to rotate in the clockwise direction, the opposite of the result expected in FIG. 4, whether or not the wearer of the device was relaxed, the device would unavoidably collapse.

Control and prevention of accidental collapse of the artificial leg of the present invention in both examples cited above is provided as illustrated in FIG. 5. In those instances, instead of control linkage 62 pivoting at pivotal bar 63 as explained for the illustration of FIG. 4, it will be drawn forward by the clockwise rotation of stump control socket 60, drawing adjusting ring 20 in the same direction or in the same counter-clockwise direction that it rotates when said socket 60 is rotated toward the opposite extreme.

Other variations of the three basic elements of the present invention are also discussed in my U.S. Pat. No. 3,666,299, some of which, including use of segments only of the elements, will also eliminate the need for a stump control socket (60) since mere compression of flesh at the stump of the wearer of the device in a conventional but hollow throughout stump socket will permit sufficient of the pendulum movement needed to control the device.

And although the illustrations and descriptive specifications have been for the most part confined to the use of the wedge-mechanism of FIGS. 1 and 2 as knee and ankle joints for artificial legs, its contemplated use in other forms such as those already discussed and briefly described is nevertheless also stressed; particularly those requiring complete or 360 degrees of rotation or flexion of the illustrated wedge ring 30 relative to grooved pulley 10 and adjusting ring 20, some intended to join two parallel, and even offset-from-the-parallel, longitudinally extended shafts for intermittent rotation relative to each other; unobstructed by the illustrated protruding extension arm 35 shown in FIG. 2.

It is evident in FIG. 1 that this may easily be accomplished by the omission of extension arm 35 and the reversal of the keying of wedge ring 30 and grooved pulley 10 to shaft 15 which may then be either the driving or driven element. Adjusting ring 20 may then also become either a driving or driven element, to be connected to a power source or transmission medium in any conventional way or, using lugs 28 as flutes in reverse, be splined to either of the longitudinally extended shafts to be appended thereto. In order to compensate for the shifting of wedge ring 30 eccentrically in adjustment, a fourth element may be needed, such as the compensating ring 40 of which only a fragment is included in FIG. 2, formed with an inner surface to match the illustrated eccentrically formed peripheral surface of adjusting ring 20, which otherwise could be formed to coincide with all other surfaces designated as concentric sufaces in the specification.

Having thus described the invention, what is claimed as new and desired to secure by Letters Patent is:

1. In a mechanical rotatable joint, a driving element and a driven element; and means in contact with said driving and said driven elements for securing the same for concentric rotation therebetween; said means being adjustable to secure said driving and said driven elements for eccentric rotatability relative to each other, to thereby restrain the relative rotation therebetween.

2. The combination of claim 1 wherein the said means is in concentric rotatability with one of said driving and said driven elements and in eccentric rotatability with the other of the said elements.

3. The combination of claim 1 wherein the said means is adjustable to restrain the said relative rotation in one rotative direction while enabling unimpeded reverse rotation.

4. The combination of claim 1 wherein the said driving and said driven elements are in wedge and groove relationship with each other.

5. The combination of claim 1 wherein the said driving and said driven elements are in bevel-face relationship with each other.

6. The combination of claim 1 wherein the said means is in wedge and groove relationship with one of said driving and said driven elements.

7. The combination of claim 1 wherein there are a plurality of said driving and a plurality of said driven elements.

8. The combination of claim 1 wherein there are a plurality of said driving and a plurality of said driven elements; and resilient means enabling axial movement of said elements relative to each other.

9. In a mechanical rotatable joint having opposing extended sections appended thereto, a driving element affixed to one of said sections and a driven element affixed to the other of said sections; and means in contact with said driving and driven elements for securing the same for concentric rotatability therebetween; said means being adjustable to secure said driving and said driven elements for eccentric rotation relative to each other, to thereby restrain relative rotation therebetween.

10. The combination of claim 9 wherein the said means is adjustable to restrain the said relative rotation in one rotative direction while enabling unimpeded reverse rotation.

11. The combination of claim 9 wherein said rotatable joint is part of an artificial leg attached to the leg stump of a wearer and wherein one said extended section is provided with extension means independent of said extended section and linked to adjusting said contact means; said extension being in contact with said leg stump and remotely adjusting said contact means to control rotation or flexure of one extended section relative to the other.

12. In a flexible joint having an upper section and a lower section, a tongued member affixed to one of said sections; a grooved member affixed to the other of said sections and in tongue-and-groove relationship with the said tongued member; and means for securing said members for relative rotation therebetween; said means being adjustable to secure said driving and said driven elements for eccentric rotation relative to each other, to restrain the relative rotation therebetween and to thereby restrain the flexure of the upper and lower sections of the flexible joint relative to each other.

13. The combination of claim 12 wherein the said means is adjustable to restrain the said relative rotation in one rotative direction while enabling unimpeded reverse rotation.

* * * * *